US012113839B2

(12) United States Patent
Ghosh et al.

(10) Patent No.: US 12,113,839 B2
(45) Date of Patent: Oct. 8, 2024

(54) MEETING MANAGEMENT ENGINE FOR A MEETING MANAGEMENT SYSTEM

(71) Applicant: MICROSOFT TECHNOLOGY LICENSING, LLC, Redmond, WA (US)

(72) Inventors: Kushal Ghosh, Bangalore (IN); Subramanian Ramakrishnan, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/808,502

(22) Filed: Jun. 23, 2022

(65) Prior Publication Data
US 2022/0417299 A1 Dec. 29, 2022

(30) Foreign Application Priority Data
Jun. 23, 2021 (IN) .............................. 202141028194

(51) Int. Cl.
*H04L 65/403* (2022.01)
(52) U.S. Cl.
CPC ................................. *H04L 65/403* (2013.01)
(58) Field of Classification Search
CPC .................................................. H04L 65/403
See application file for complete search history.

(56) References Cited

U.S. PATENT DOCUMENTS

| 7,072,641 | B2 | 7/2006 | Satapathy |
| 7,636,544 | B2 | 12/2009 | Yamada et al. |
| 8,280,863 | B2 * | 10/2012 | Pantos ................. H04L 65/70 707/693 |
| 2006/0019650 | A1 | 1/2006 | Kedem |

(Continued)

OTHER PUBLICATIONS

"Command Recording Software," Retrieved From: https://www.marchnetworks.com/download/6a5616de-c73e-e911-bdf8-061af56289a5, 2019, 4 Pages.

(Continued)

*Primary Examiner* — Andrew T Chiusano
(74) *Attorney, Agent, or Firm* — Shook, Hardy & Bacon L.L.P.

(57) ABSTRACT

Methods, systems, and computer storage media for providing a missing meeting content manifest associated with missing meeting content for a meeting (e.g., a meeting session) in a meeting management system. A missing meeting content manifest—a record of data of meeting content—can be a file that identifies segments of data that are associated with the missing meeting content. In operation, the meeting management system detects that an attendee is disconnected from the meeting and later determines that the attendee has reconnected to the meeting. The meeting management system calculates a number of segments of the meeting content associated with a period of time the attendee was so disconnected and generates a missing meeting content manifest corresponding to the number of segments of the meeting content associated with the period of (Continued)

time the attendee was disconnected. The meeting management system communicates the missing meeting content manifest to the attendee device.

20 Claims, 10 Drawing Sheets

(56) References Cited

U.S. PATENT DOCUMENTS

| | | | |
|---|---|---|---|
| 2008/0036917 A1* | 2/2008 | Pascarella | H04N 21/235 725/42 |
| 2009/0245490 A1 | 10/2009 | Cool | |
| 2009/0257572 A1 | 10/2009 | Klein | |
| 2014/0362979 A1 | 12/2014 | Kaplan et al. | |
| 2016/0234268 A1* | 8/2016 | Ouyang | H04L 67/54 |
| 2020/0090648 A1* | 3/2020 | Wambugu | G10L 25/48 |
| 2022/0086209 A1* | 3/2022 | Suto | H04L 65/75 |
| 2022/0286312 A1* | 9/2022 | Tiwari | H04L 12/1822 |
| 2022/0303151 A1* | 9/2022 | Bhide | H04L 12/1822 |
| 2022/0353365 A1* | 11/2022 | Anderson | G10L 15/26 |
| 2022/0407900 A1* | 12/2022 | Gawande | G10L 15/1815 |

OTHER PUBLICATIONS

"UA Server RTSP Communication", Retrieved From: https://web.archive.org/web/20170715163407/https://www.w3.org/2008/WebVideo/Fragments/wiki/UA_Server_RTSP_Communication, Jul. 15, 2017, 7 Pages.

Colciago, et al., "Shadow Archiving in Video Surveillance Systems", In White Paper of March Networks, Jan. 2010, 10 Pages.

Kornich, et al., "Tutorial: Event-based Video Recording to the Cloud and Playback from the Cloud", Retrieved From: https://docs.microsoft.com/en-us/azure/media-services/live-video-analytics-edge/event-based-video-recording-tutorial, May 27, 2020, 20 Pages.

"International Search Report and Written Opinion Issued in PCT Application No. PCT/US22/029113", Mailed Date: Aug. 31, 2022, 12 Pages.

Soysal, et al., "Troubleshoot Connectivity Issues with the Microsoft Teams Client", Retrieved From: https://docs.microsoft.com/en-us/microsoftteams/connectivity-issues, Mar. 24, 2021, 2 Pages.

* cited by examiner

MEETING MANAGEMENT ENGINE FOR A MEETING MANAGEMENT SYSTEM

CROSS-REFERENCE TO RELATED APPLICATIONS

This application claims priority to Indian Patent Application No.: 202141028194, filed Jun. 23, 2021, the entire contents of which is hereby incorporated by reference in its entirety.

BACKGROUND

Users rely on applications and services to facilitate remote and virtual meetings. Distributed computing systems (e.g., cloud computing platforms) host content management systems that support network access to meeting content. A meeting management system can be part of a content management system in a distributed computing system that provides different types of productivity tools from word processing to task management. The meeting management system can operate as part of the content management system to provide teleconferencing, telecommuting, distance education, and social relations services. In particular, the meeting management system performs computing tasks to facilitate meetings. For example, meeting management systems support video calls and supporting meeting operations including attendance tracking, user session mediation, and recording and distributing meeting content.

Conventionally, meeting management systems are not configured with computing logic to handle attendee device technical disruptions or disconnections. For example, a meeting management system is implemented as a continuously streaming video session, optionally with on-demand or automatic recording. The continuously streaming video model does not adequately address meeting session disconnections (e.g., packet loss disruptions, user network disconnection, or loss of power). To access content missed during packet loss or network disconnection, full recordings—including superfluous content—are retrieved from the content management system. As such, a more comprehensive meeting management system—with an alternative basis for performing meeting management operations—can improve computing operations and interfaces in meeting management systems.

SUMMARY

Various aspects of the technology described herein are generally directed to systems, methods, and computer storage media for, among other things, providing a missing meeting content manifest associated with missing meeting content for a meeting in a meeting management system. A missing meeting content manifest is a record of data of meeting content (e.g., video data) of a meeting. The missing content manifest can be a file that identifies segments of data that are associated with missing meeting content, where the missing meeting content is stored in a plurality of segments (e.g., video segments). The missing meeting content corresponds to meeting content associated with a period of time an attendee device is disconnected from a meeting. The meeting management system (e.g., via a meeting management engine) detects that the attendee device is disconnected from the meeting and later determines that the attendee device has reconnected to the meeting. The meeting management system calculates a number of segments of the meeting content associated with a period of time the attendee device was disconnected. The meeting management system further generates the missing meeting content manifest corresponding to the number of segments of the meeting content associated with the period of time the attendee device was disconnected. The meeting management system then communicates the missing meeting content manifest to the attendee device, such that corresponding missing meeting content is retrieved using the missing meeting content manifest.

Conventionally, meeting management systems are not configured with logic to handle technical meeting disruptions or disconnections that make an attendee device unable to access meeting content. A technical solution—to the limitations of conventional meeting management systems—provides a missing meeting content manifest associated with missing meeting content when an attendee device is disconnected from a meeting. In operation, an attendee device connects to a meeting of a meeting management system. The meeting management system that is configured to provide a meeting session such that the attendee device connects to the meeting. The attendee device may become disconnected from the meeting because of any number of technical disruptions. For example, the attendee device may lose power, the attendee device may have an unstable network connection, or the attendee device may experience a software-based interruption. The meeting management system detects that the attendee device is disconnected (or experiencing sporadic disruptions) from a meeting, and, at a later time, determines that the attendee device has reconnected to the meeting. For the period of time during which the attendee device was disconnected, the meeting management system can calculate a number of segments of meeting content (e.g., video content) of the meeting. A missing meeting content manifest corresponding to the number of segments of the meeting content can be generated and communicated to the attendee device.

In addition, the meeting management system operates to generate and communicate a missing meeting content manifest for meeting content (e.g., video content) that was first captured on a speaker attendee device. The missing meeting content manifest—for the remotely captured meeting (i.e., speaker-recorded missing meeting content)—can be communicated to a second attendee device. In particular, the speaker attendee device may become disconnected from the meeting because of any number of technical disruptions. The meeting management system detects that the speaker attendee device is disconnected from the meeting, and at a later time determines that the speaker attendee device has reconnected to the meeting. The meeting management system can receive—from the speaker attendee device—speaker-recorded missing meeting content. For the period of time during which the speaker attendee device was disconnected, the meeting management system can calculate a number of segments of speaker-recorded missing meeting content of the meeting. A missing meeting content manifest corresponding to the number of segments of the speaker-recorded missing meeting content can be generated and communicated to the second attendee device.

Moreover, the meeting management system operates to provide missing meeting content interface elements on attendee devices and speaker attendee devices to support generating, communicating, and providing a missing meeting content manifest. A missing meeting content manifest—associated with an attendee device that was disconnected from a meeting—can be communicated via missing meeting content interface elements for communicating missing meeting content associated with the missing meeting content manifest. For example, a portion of a meeting interface can be designated for displaying missing meeting content interface elements associated with the missing meeting content manifest along with supplemental missing meeting content data. The missing meeting content manifest can be interface elements (e.g., controls) that cause display of the missing meeting content associated with the missing meeting content manifest. The supplemental missing meeting content data can be metadata or extracted data from the meeting content. The missing meeting content manifest and the supplemental missing meeting content data support summarizing and presenting in a particular manner, missing meeting content of the missing meeting content manifest.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview of Technical Problems, Technical Solutions, and Technological Improvements Meeting management systems operate within a content management system to provide teleconferencing, telecommuting, distance education, and social relations services. In particular, meeting management systems provide access to a content management system and perform computing tasks to facilitate meetings. For example, meeting management systems support scheduling, attendance tracking, user session mediation, and recording and distributing meeting content (e.g., audio and visual content, transcriptions of same, presentation materials). Conventionally, meeting management systems are not configured with computing logic to handle attendee device technical disruptions or disconnections from a meeting. Some conventional meeting management systems may indicate general interferences with a meeting. For example, a conventional meeting management system can indicate that a speaking attendee is muted, when the attendee is speaking, or indicate that an attendee device currently has an unstable internet connection. Such meeting management systems do not provide computing logic or a computation model for when the attendee device does not provide meeting content because of a technical disruption.

Moreover, conventional meeting management systems do not facilitate identifying missing meeting content in a manner that summarizes and communicates the missing meeting content in an efficient way. Currently, a meeting management system may simply provide access to full recordings including superfluous material. For example, attendee device that is disconnected from a meeting for 10 minutes out of a 2-hour presentation would cause an attendee to use the attendee device to query the meeting management system. This query causes the meeting management system to inefficiently retrieve and communicate the entire 2-hour meeting content. Retrieving meeting content in this manner triggers operations that cause additional inefficient computations by the meeting management system to identify the portion of the 2-hour meeting content that is relevant to the attendee. As such, a more comprehensive meeting management system—with an alternative basis for performing meeting management operations—can improve computing operations and interfaces in meeting management systems.

Embodiments of the present disclosure are directed to providing a missing meeting content manifest associated with missing meeting content for a meeting in a meeting management system. A missing meeting content manifest is a record of data of meeting content (e.g., video data) of a meeting. The missing content manifest can be a file that identifies segments of data that are associated with missing meeting content, where the missing meeting content is stored in a plurality of segments. The missing meeting content corresponds to meeting content of a period of time an attendee device is disconnected from a meeting.

Figure 1A:
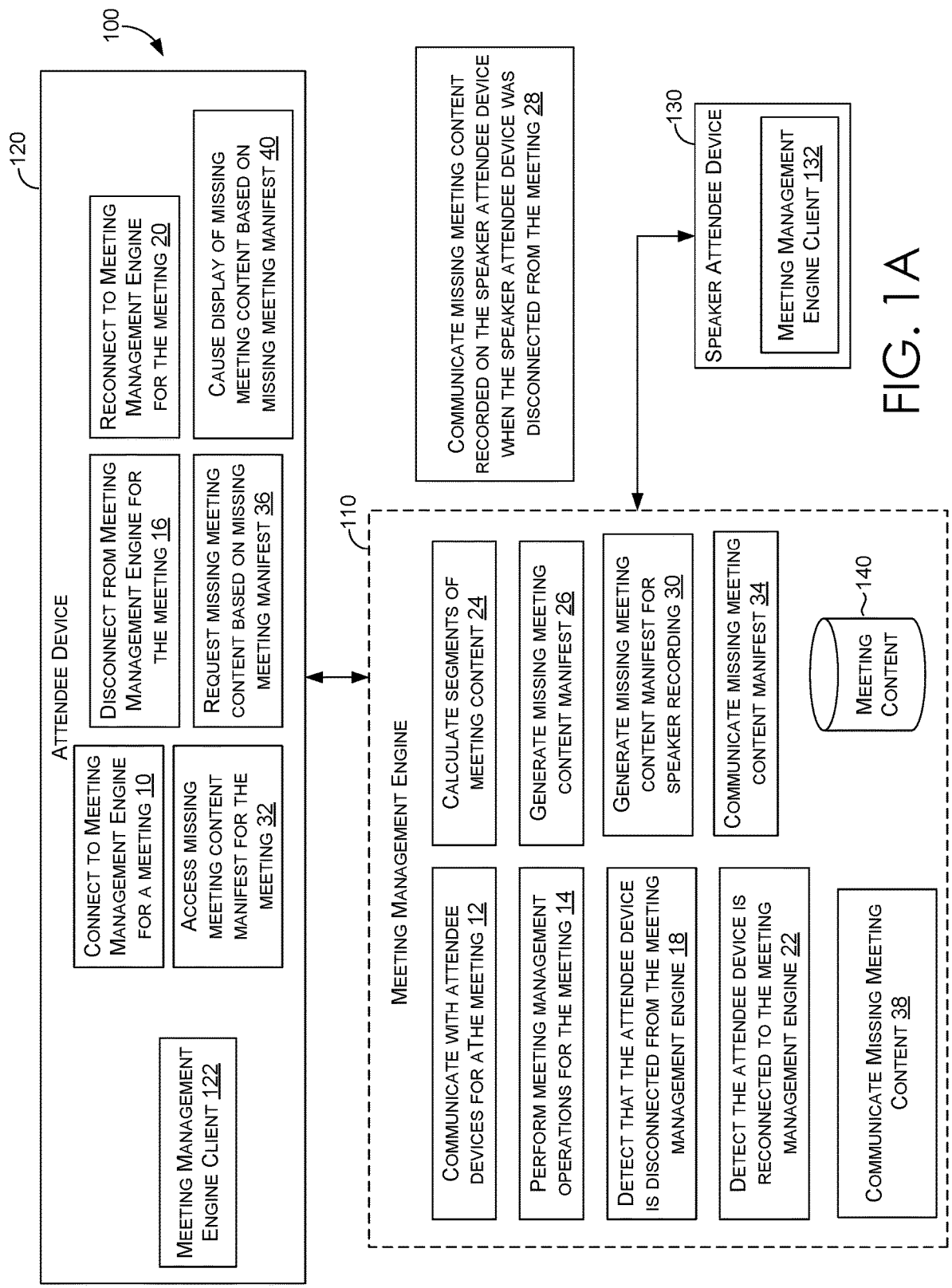
FIG. 1A is a block diagram of an exemplary meeting management system for providing missing meeting content manifests using a meeting management engine of the meeting management system, in accordance with aspects of the technology described herein.
Figure 1B:
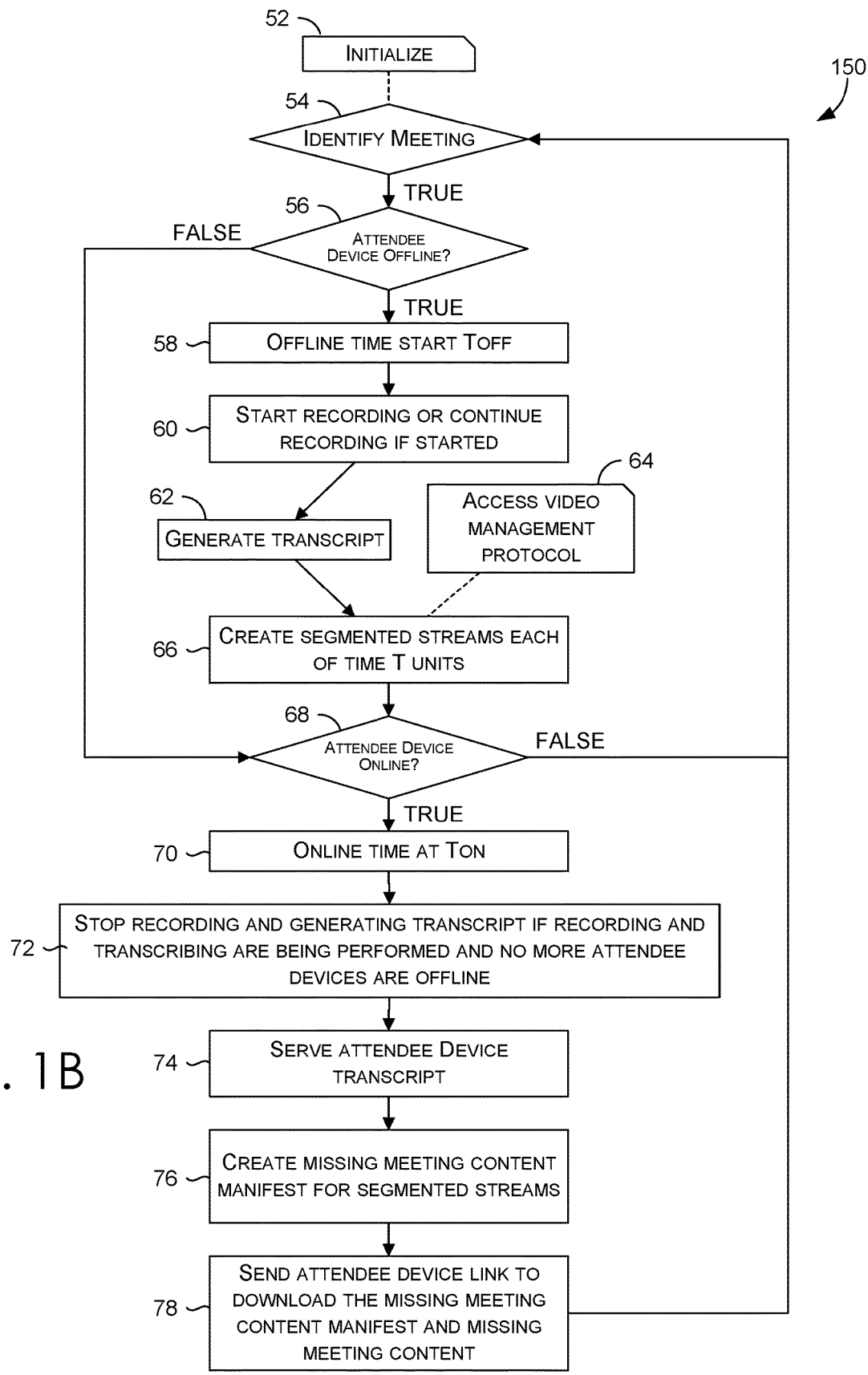
FIG. 1B is a block diagram of an exemplary schematic for providing missing meeting content manifests using a meeting management engine in a meeting management system, in accordance with aspects of the technology described herein.
Figure 1C:
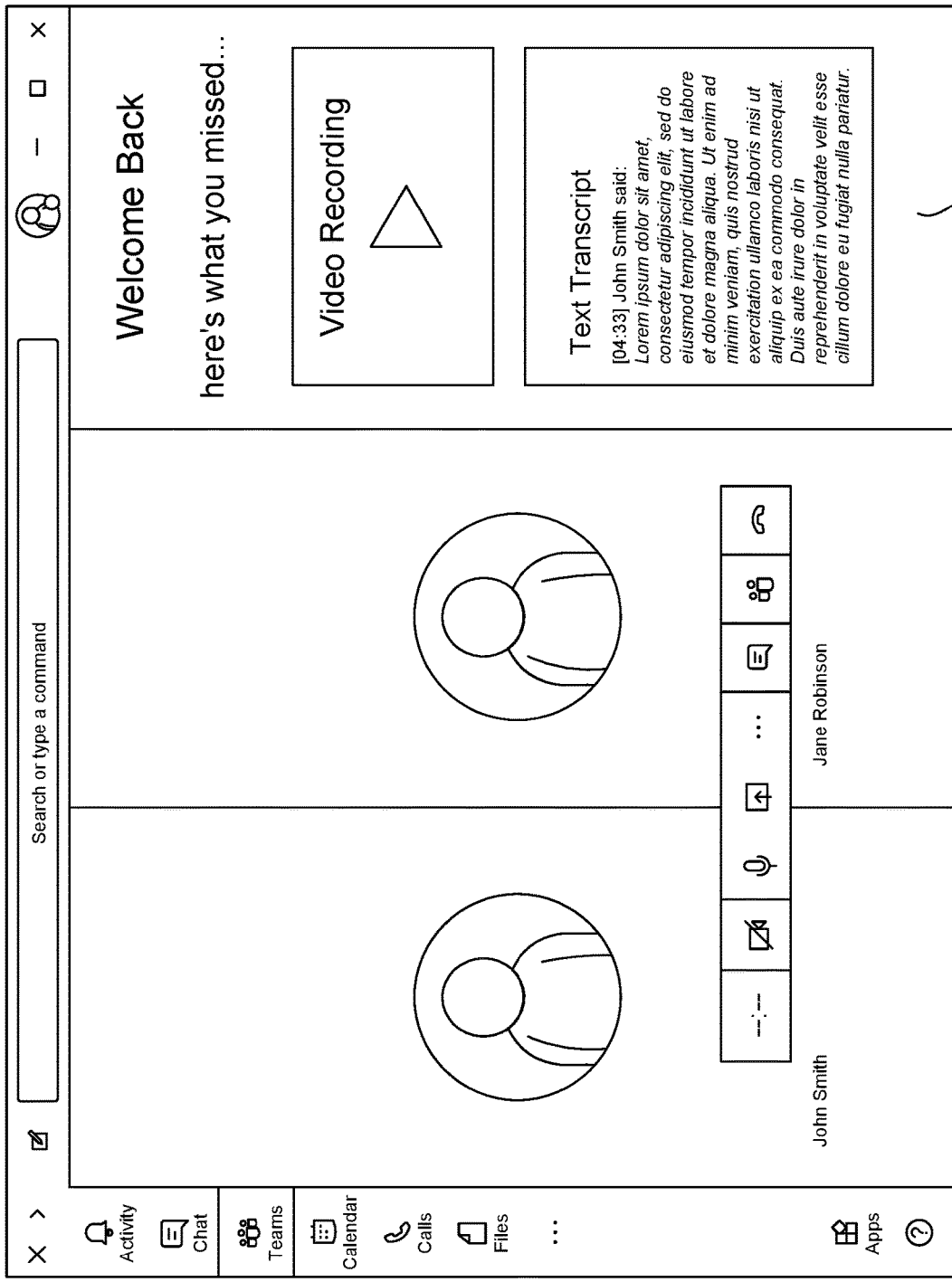
FIG. 1C is an exemplary meeting management system interface based on missing meeting content manifests of a meeting management system, in accordance with aspects of the technology described herein.

Aspects of the technical solution can be described by way of examples and with reference to FIG. 1A, FIGS. 1B, and 1C. FIG. 1A illustrates a meeting management system having a meeting management engine 110, an attendee device 120 having meeting management engine client 122, speaker attendee device 130 having meeting management engine client 132, and meeting content 140.

The meeting management system 100 that is configured to provide missing meeting content for a meeting in a meeting management system. The meeting management system includes the meeting management engine 110 that operates with management engine clients (e.g., meeting management engine client 122 and meeting management engine client 132) and manages meeting content (e.g., meeting content 140) and to provide the functionality described herein. The meeting management engine clients include client-side computing logic and instructions that complement and supplement the server-side computing logic and instructions of the meeting management engine 110 for providing the missing meeting content manifest. For example, the meeting management system 110 can perform operations based on the missing meeting content manifest and provide interfaces for accessing, communicating, and generating interfaces (i.e., missing meeting content interface elements) associated with the missing meeting content, as described herein.

Meeting content (e.g., meeting content 140) can be stored in a database of the meeting management system 100 and can include data that support providing the services associated with a meeting management system. For example, a meeting management system can support recording calls as video (i.e., video data), where the meeting management system is enabled to record the calls. Additional data (e.g., metadata) associated with the meeting content can be tracked and stored.

The meeting management system 100 can specifically operate based on a video content management protocol. A video content management protocol can be a streaming protocol that supports recording and streaming media content. In this way, the video management protocol supports managing content of the meeting content. The video content can specifically be managed and stored as a plurality of segments. For example, video content for a meeting can be recorded and divided into a plurality of segments having time codes. The time codes are used to identify the plurality of segments that are associated with a time period when an attendee device is disconnected from the meeting. Video content management protocols can include dynamic adaptive streaming over HTTP (DASH or MPEG-DASH) and HTTP Live Streaming (HLS). Other variations and combinations of video content management protocols that support managing video content as a plurality of segments are contemplated with embodiments described herein.

With reference to FIG. 1A, initially, at block 10, attendee device 120 connects to the meeting management engine 110 for a meeting. The meeting management client 122 accesses a meeting session supported via the meeting management engine 110. At block 12, the meeting management engine 110 communicates with attendee devices for the meeting. The meeting management engine 110 can initialize the meeting session with several attendee devices, where a speaker attendee device may be explicitly identified or a speaker attendee device is impliedly identified (e.g., identified based on audio that is processed at the speaker attendee device).

At block 14, the meeting management engine 110 performs different operations to support the meeting. For example, the meeting management engine 110 may actively record the meeting for a meeting where an indication has been communicated that the meeting should be recorded. The meeting management engine 110 may further initialize data structures and program instructions that support detecting a disconnected and reconnected attendee device (e.g., attendee device state) to support calculating a number of segments associated with the attendee device being disconnected. At block 16, the attendee is disconnected from the meeting management engine 110. At block 18, the meeting management engine 110 detects that the attendee device is disconnected from the meeting management engine 110. At block 20, the attendee device reconnects to the meeting management engine 110. At bock 22, the meeting management engine 110 detects that the attendee device is reconnected to the meeting engine 110.

It is contemplated that upon detecting the an attendee device is disconnected from the meeting management engine 110, the meeting management engine 110 begins recording the meeting content, and when the meeting management engine 110 detects that the attendee device has reconnected to the meeting management engine 110, the meeting management engine 110 stops recording the meeting content. For example, an attendee device state indicator can operate as an indication to start and stop recording meeting content as missing meeting content that will be associated with a missing meeting content manifest. Other variations and combinations of recording the meeting continuously or the recording the meeting when a disconnected attendee device is detected are contemplated with embodiments described herein.

At block 24, the meeting management engine 110 calculates a number of segments of the meeting content associated with a time period when the attendee device was disconnected. In particular, the meeting content can be video content with time codes. The video content is recorded in a plurality of segments based on the video management protocol of the meeting management system. The time codes can be used to determine a plurality of segments (i.e., video segments) associated with the period when the attendee device was disconnected. In one embodiment, calculating the number of segments can be based on determining a start time associated a disconnected state of the attendee device, determining an end time associated a reconnected state of the attendee device, and based on the start time and the end time, identifying the number of segments of meeting content corresponding to the start time and the end time.

At block 26, the meeting management engine 110 generates the missing meeting content manifest. A missing meeting content manifest is a record of data of meeting content (e.g., video data) of a meeting. The missing content manifest can be a file that identifies segments of data that are associated with missing meeting content, where the missing meeting content is stored in a plurality of segments. The missing meeting content corresponds to meeting content associated with a period of time the attendee device 120 is disconnected from a meeting.

At block 28, in some embodiments, the speaker attendee device 130 can communicate missing meeting content recorded on the speaker attendee device when the speaker attendee device was disconnected from the meeting management engine 110. For example, a speaker attendee device 130 may become disconnected from the meeting management engine 110 such that in its disconnected state, the speaker attendee device 130 begins recording meeting content. In another example, where the meeting content was already being recorded, the speaker attendee device 130 may simply flag a start time of the disconnected period and an end time of the disconnected period. In addition, it is contemplated that the speaker attendee device 130 may include missing meeting content interface elements that support recording the missing meeting content. For example, a prompt or an information interface element can be generated such that the speaker attendee device 130 begins recording missing meeting content when the speaker attendee device 130 is disconnected from the meeting management engine 110.

The missing meeting content that was recorded on the speaker attendee device 130 can be communicated to the meeting management engine 110 to cause the meeting management engine 110, at block 30, to generate a missing meeting content manifest for the missing meeting content recorded on the speaker attendee device ("speaker recording"). It is contemplated that the speaker attendee device 130 may include logic to generate the missing meeting content manifest for the speaker recording and communicate both the missing meeting content manifest and the speaker recording to the meeting management engine 110. The missing meeting content that was recorded at the speaker attendee device 130 can be communicated—via the meeting management engine—to the attendee devices 120.

At block 32, the attendee device 120 accesses the missing meeting content manifest. For example, upon reconnecting to the meeting, the meeting management engine 110 may generate a missing meeting content interface based on missing meeting content interface elements that support accessing the missing meeting content. In some embodiments, the attendee device may generate a prompt to receive an indication that the missing meeting content manifest should be accessed. At block 34, the meeting management engine 110 communicates the missing meeting content manifest. The missing meeting content manifest may be communicated along with supplemental missing meeting content data that includes metadata and extracted data from the number of segments of the missing meeting content. For example, the supplemental missing meeting content data can include data indicating the duration of the disconnected period, the cause of the disconnection, and also include a transcription of the video content and topics identified within the video content that can simplify accessing and navigating the missing meeting content.

At block 36, the attendee device 120 requests missing meeting content based on the missing meeting manifest. The missing meeting manifest may be provided via an interface of the meeting along with missing meeting content interface elements that support retrieving missing meeting content associated with the missing meeting content manifest. For example, the missing meeting content manifest can be provided as one or more links that are hyperlinks to corresponding segments of the missing meeting content. Moreover, the missing meeting content manifest can be integrated into existing interface elements of the meeting interface (e.g., chat interface) such that the missing meeting content manifest appears as a chat entry that can be selected to access the missing meeting content.

At block 38, the meeting management engine 110 communicates the missing meeting content. The missing meeting content can be communicated along with supplemental missing meeting content data, as described herein. Currently, a meeting management system may simply provide access to full recordings including superfluous material. For example, attendee device that is disconnected from a meeting for 10 minutes out of a 2-hour presentation would cause an attendee to use the attendee device to query the meeting management system. This query causes the meeting management system to inefficiently retrieve and communicate the entire 2-hour meeting content. Retrieving meeting content in this manner triggers operations that cause additional inefficient computations by the meeting management system to identify the portion of the 2-hour meeting content that is relevant to the attendee At block 40, the attendee device can cause display of missing meeting content based on the missing meeting content manifest. The missing meeting content includes the number of segments of meeting content associated with the missing meeting content manifest. For example, if an attendee device was disconnected for 10 minutes from a video call meeting, the missing meeting content would include 10 minutes of video data—recorded in a plurality of video segments—that are communicated to the attendee device. The missing meeting content can be communicated via missing meeting interface elements that support generating and accessing the missing meeting content. For example, the missing meeting interface elements can include a video player that includes supplemental missing meeting content data and controls for accessing portions of the missing meeting content. Other variations and combinations of meeting interface elements and missing meeting content interface elements are contemplated with embodiments described herein.

With reference to FIG. 1B, FIG. 1B illustrates an exemplary computing logic 150 for providing missing meeting content manifest associated with missing meeting content. In operation, at step 52, the logic initializes, and at step 54, a meeting is identified or a determination is made that a meeting is going on. At step 56, the logic includes determining whether an attendee device is offline. At step 58, the logic includes identifying an offline time start $T_{off}$. At step 60, the logic includes starting recording or continuing recording if the recording was already being performed. At step 62, the logic further includes generating a script. At step 64, the logic includes accessing the video management protocol. At step 66, the logic includes creating the segment streams of each time T units of the recording. At step 68, the logic includes determining whether the attendee device is online. At step 70, the logic includes upon determining that the attendee device is back online, an online time at $T_{on}$ is recorded. At step 72, the logic includes stopping recording of the video and generating of the transcript, if recording of the video and generation of the transcript are already being performed and no more attendee devices are offline. At step 74, the logic includes serving the transcript to the attendee device. At step 76, the logic includes generating a missing meeting manifest for the segmented streams. At step 78, the logic includes communicating a link to the attendee device to download the missing meeting content manifest and the missing meeting content.

With reference to FIG. 1C, FIG. 1C illustrates an exemplary missing meeting content interface 100C that includes missing meeting content interface elements (e.g., text transcript portion 110C). The missing meeting content interface elements support generating, communicating, and providing a missing meeting content manifest. A missing meeting content manifest—associated with an attendee device that was disconnected from a meeting—can be communicated via missing meeting content interface elements for communicating missing meeting content associated with the missing meeting content manifest. For example, the missing meeting content interface can include a text transcript portion 110C for providing text transcript of the missing meeting content.

The missing meeting content manifest can be integrated into existing interface elements of the meeting interface (e.g., chat interface) such that the missing meeting content manifest appears as a chat entry that can be selected to access the missing meeting content. The missing meeting content manifest can be provided as one or more links that are hyperlinks to corresponding segments of the missing meeting content. Moreover, in one embodiment, the missing meeting content can be provided as a delay of a live stream. In this way, the attendee device has access to the delayed live stream and optionally an indication of an amount of time that the attendee device is behind. As such, the attendee device can receive indication to increase the playback speed to catch up to the live stream. Other variations and combinations for providing the missing meeting content are contemplated with embodiments described herein.

Figure 2A:
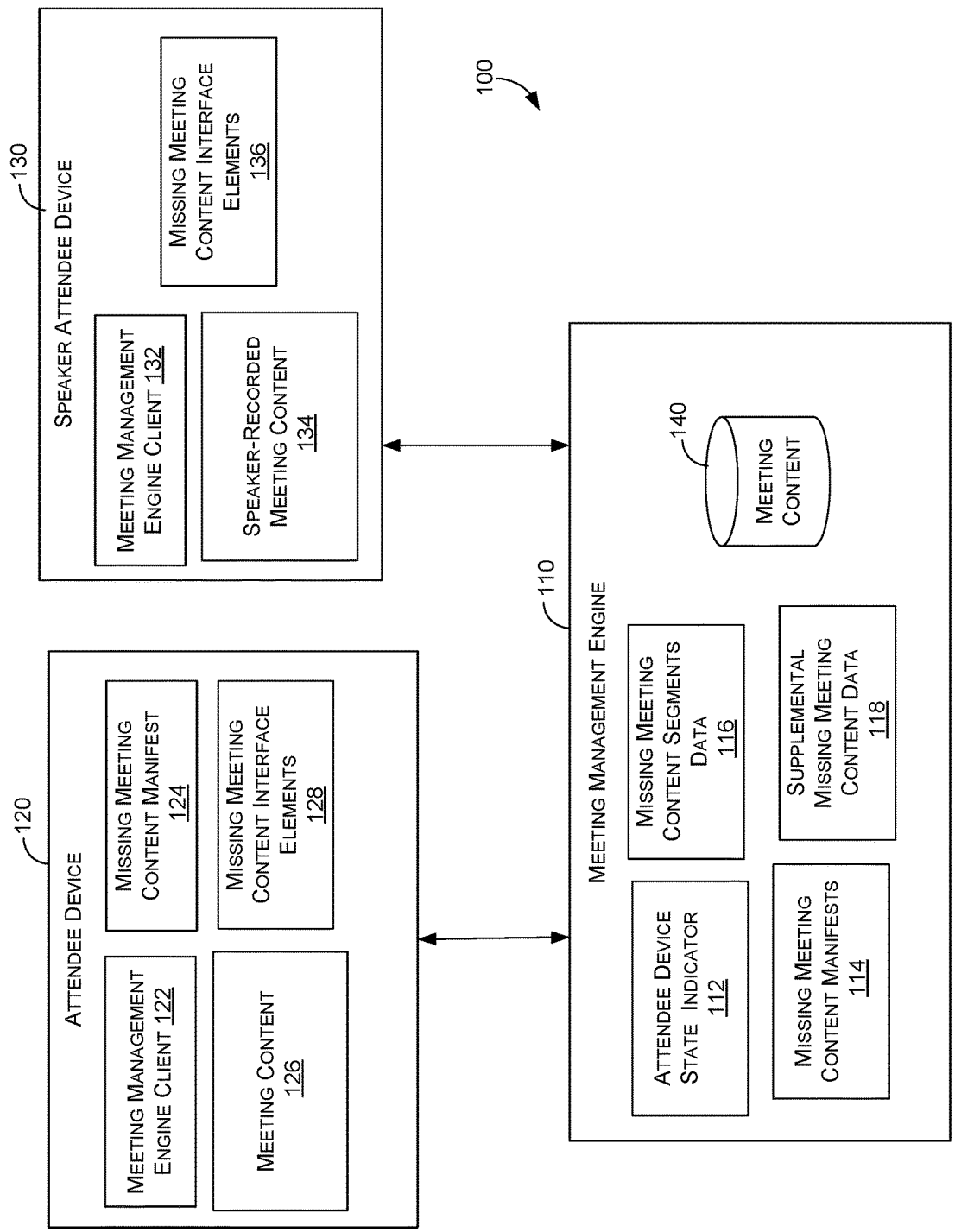
FIG. 2A is an exemplary meeting management system for providing missing meeting content manifests using a meeting management engine in the meeting management system, in accordance with aspects of the technology described herein.
Figure 2B:
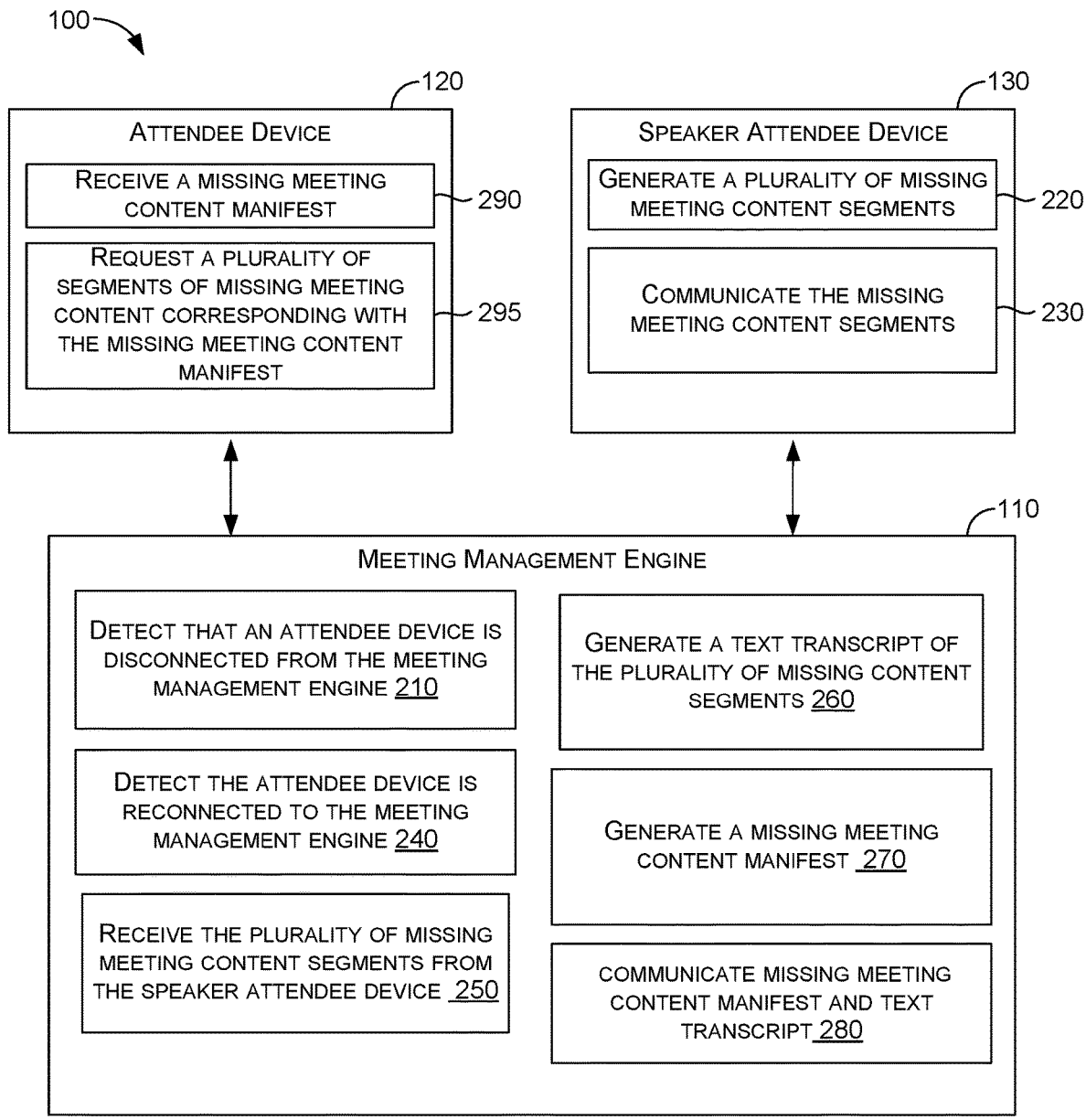
FIG. 2B is an exemplary meeting management system for providing missing meeting content manifests using a meeting management engine in the meeting management system, in accordance with aspects of the technology described herein.

Overview of Exemplary Environments for Providing Missing Meeting Manifest Using a Meeting Management Engine in a Meeting Management System Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example meeting management system 100 in which methods of the present disclosure may be employed. In particular, FIG. 2A shows a high level architecture of the meeting management system 100 in accordance with implementations of the present disclosure. Among other engines, managers, generators, selectors, or components not shown (collectively referred to herein as "components"), the technical solution environment of meeting management system 110 includes meeting management engine 110—including attendee device state indicator 112, missing meeting manifests 114, missing meeting content segment data 116, supplemental missing meeting content data 118, attendee device 120—including meeting management engine client 122, missing meeting content manifest 124, meeting content 126, and missing meeting content interface element 128, and speaker attendee device 130—including meeting management engine client 132, missing meeting content recorded on attendee device 134, and missing meeting content interface elements 136.

Meeting management engine 110 is responsible for providing a missing meeting content manifest (e.g., missing meeting content manifests 114) associated with missing meeting content for a meeting in a meeting management system. In operation, the meeting management engine 110 detects that an attendee device (e.g., attendee device 120 and speaker attendee device 130) is disconnected from a meeting associated with the meeting management system 100 and detects that the attendee device has reconnected to a meeting associated with the meeting management system 100.

Detecting that the attendee device is disconnected from or reconnected to the meeting is based on identifying a plurality of disruption conditions that indicate a complete or an intermittent disconnected state or reconnected state of the attendee device. For example, the meeting management system may a connection-management protocol, such as TCP/IP or any other appropriate protocol and determine a disconnected or reconnected attendee device based on any of the following: receiving a termination packet from the attendee device, by failing to receive any ACK packets for longer than a timeout period, or by initiating disconnection itself. The meeting management engine 110 may detect that the attendee is disconnected or reconnected and maintain state information (e.g., attended device state indicator 112) of the attendee device.

The meeting management engine 110 that is configured to provide access to a meeting corresponding to a meeting session associated with meeting content, where the meeting content is stored as a plurality of segments (e.g., missing meeting content segments data 116). For example, the meeting content can be video content associated with a video call. In this way, the meeting management system 110 operates based on a video content management protocol that supports managing the video content of the meeting content as the plurality of segments. The plurality of segments are associated with time codes associated with generating missing meeting content manifests.

The meeting management engine 110 employs different computing logics for providing the missing meeting content manifests and corresponding missing meeting content. For example, the meeting content may continuously be recorded and the missing meeting content generated based on a start time and end time of the disconnected period of the attendee device. The meeting content may be recorded exclusively during periods when at least one attendee device is disconnected from the meeting. Each segment of the plurality of segments may be recorded in parallel with generating transcripts of the meeting content associated with the corresponding segment being recorded.

In one embodiment, a disconnected time is identified and a reconnected time is identified and missing meeting content is identified as meeting content recorded between the disconnected time and the reconnected time. As such, a number of segments of the meeting content associated with the period of time the attendee device as disconnected is calculated. The segments of the meeting content can be used to generate a missing meeting content manifest 114.

The missing meeting manifest is associated with supplemental missing meeting content data (e.g., supplemental missing meeting content data). The supplemental missing meeting content data includes metadata of the missing meeting content. For example, information indicating the duration of the missing meeting content data, an amount of time behind a live stream of the meeting session, and other video-related meeting data. The supplemental missing meeting content data can further include extracted information from the number of segments of the meeting content.

The meeting management engine 110 communicates the missing meeting content manifest (e.g., missing meeting content manifest 124) to the attendee device 120 to cause display of an interface element (e.g., missing meeting content interface 128) associated with missing meeting content manifest. The interface element comprises an interface control that supports accessing and causing display of meeting content (e.g., meeting content 126) corresponding to the missing meeting content manifest. The interface control is selected from the following: a link to cause download of the missing meeting content; a chat interface that is configured to provide access to text transcript associated with the missing meeting content; and a delayed playback control to access the missing meeting content.

The meeting management engine 110 can operate with the speaker attendee device 130 to communicate a missing meeting content manifest based on meeting content that was recorded at the speaker attendee device (e.g., speaker-recorded meeting content 134). The number of segments of the meeting content is based on meeting content that was recorded at a speaker attendee device that is different from the attendee device. Recording the meeting content at the speaker attendee device is triggered (e.g., via missing meeting content interface element 136) when the speaker attendee device is disconnected from the meeting.

With reference to FIG. 2B, FIG. 2B includes an exemplary method for providing missing meeting content manifests in a meeting management system. FIG. 2B includes components that correspond to components described with reference to FIG. 2A. In operation, at block 210, the meeting management engine 110 detects that an attendee device is disconnected from the meeting management engine 110. At block 220, the speaker attendee device generates a plurality of missing meeting content segments, and at block 230, communicates the missing meeting content segments.

At block 240, the meeting management engine 110 detects that the attendee is reconnected to the meeting management engine 110, and at block 250, receives the plurality of missing meeting content segments from the speaker attendee device from the speaker attendee device. At block 260, the meeting management engine 110 generates a text transcript associated with the plurality of missing content segments, at block 270, generates a missing meeting content manifest for the plurality of missing content segments, and at block 280, communicates missing meeting content manifest and text transcript. At block 290, the attendee device 120 receives a missing meeting content manifest from the meeting management engine 110, and at block 295, requests a plurality of segments of missing meeting content corresponding to the missing meeting content manifest.

Exemplary Methods for Providing Missing Meeting Content Manifests

Figure 3:
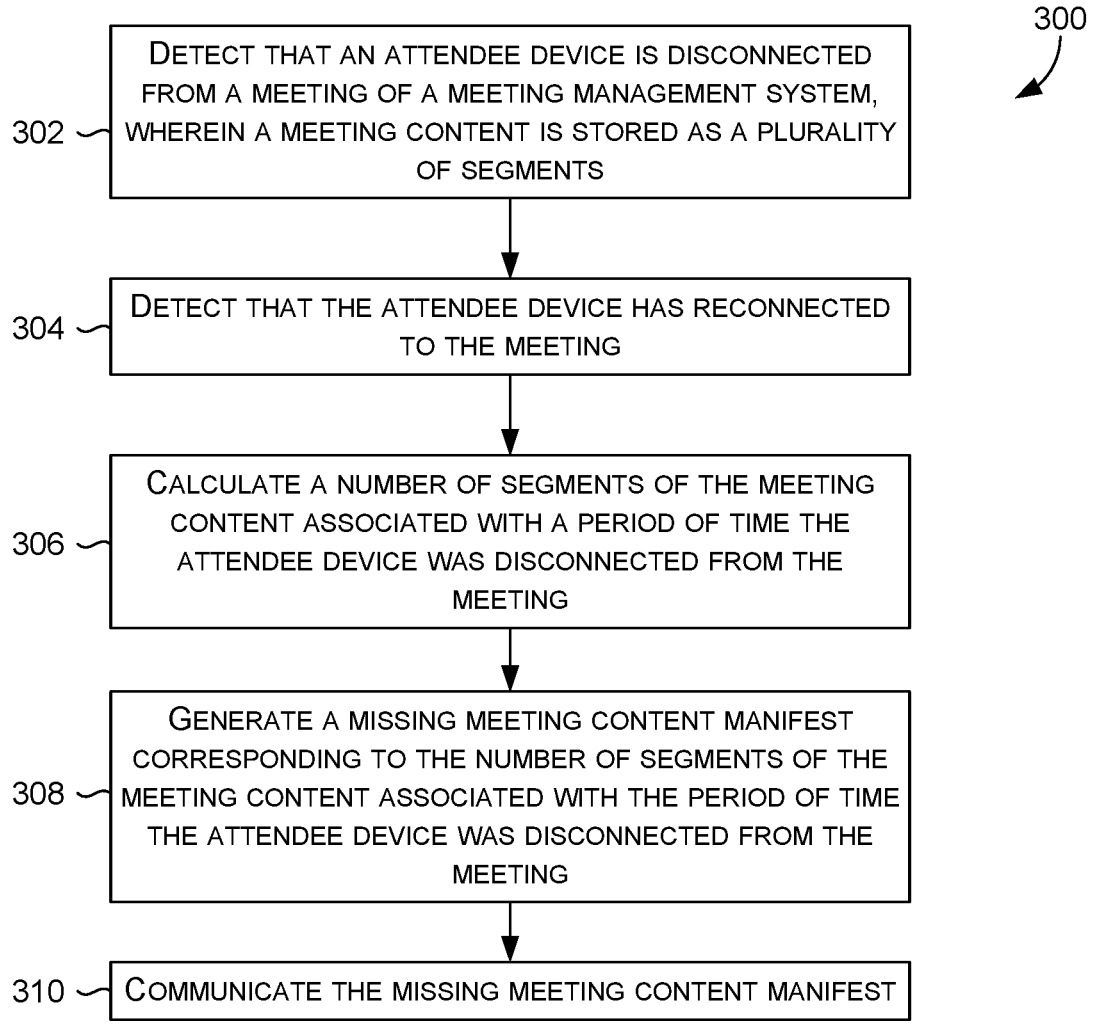
FIG. 3 provides a first exemplary method of providing missing meeting manifests using a meeting management engine in a meeting management system, in accordance with aspects of the technology described herein.
Figure 4:
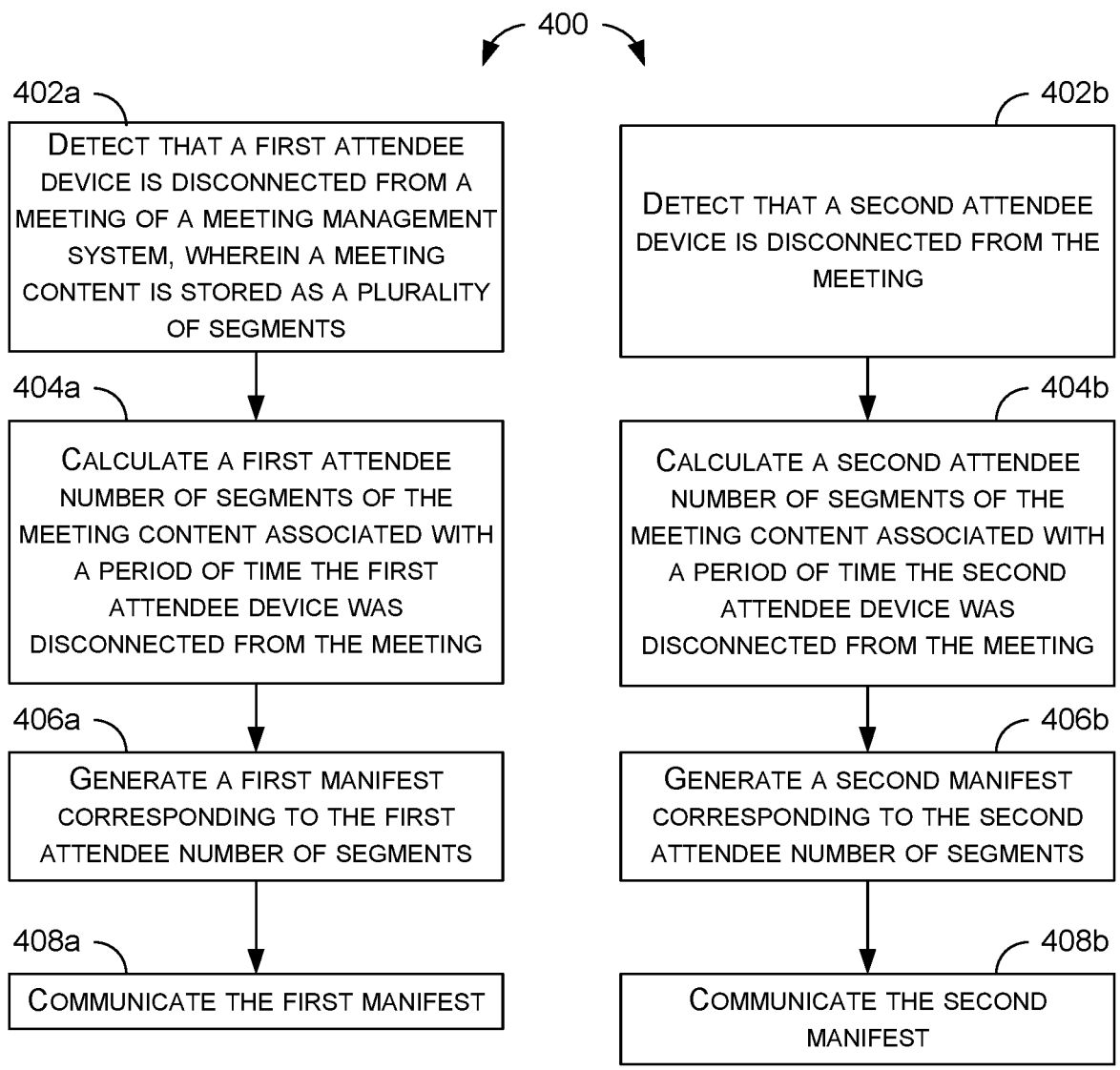
FIG. 4 provides a second exemplary method of providing missing meeting manifests using a meeting management engine in a meeting management system, in accordance with aspects of the technology described herein.
Figure 5:
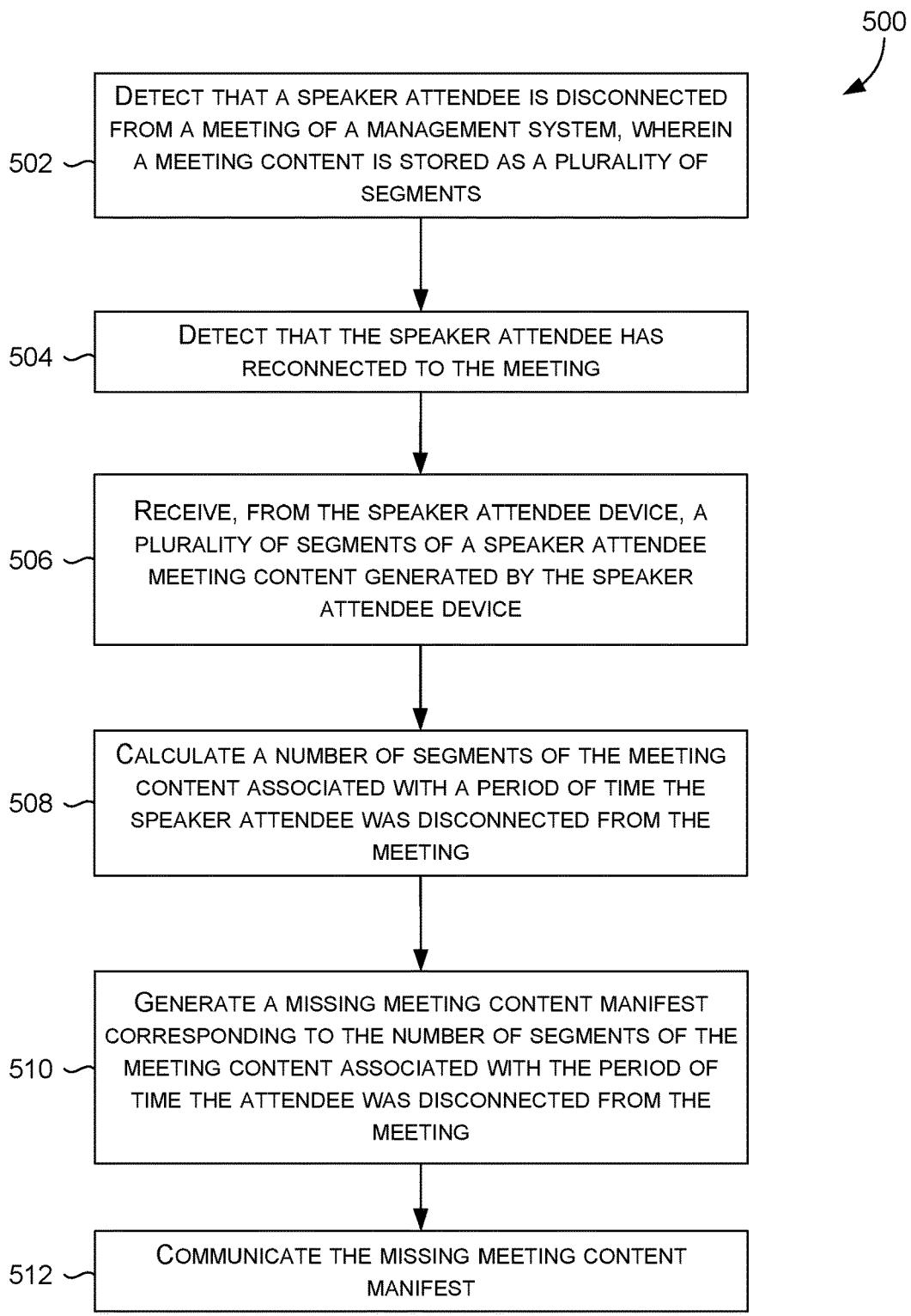
FIG. 5 provides a third exemplary method of providing missing meeting manifests using a meeting management engine in a meeting management system, in accordance with aspects of the technology described herein.

With reference to FIGS. 3, 4, and 5, flow diagrams are provided illustrating methods for providing missing meeting content manifests in a meeting management system. The methods may be performed using the meeting management system described herein. In embodiments, one or more computer-storage media having computer-executable or computer-useable instructions embodied thereon that, when executed, by one or more processors can cause the one or more processors to perform the methods (e.g., computer-implemented method) in the meeting management system (e.g., a computerized system or computing system).

Turning to FIG. 3, a flow diagram is provided that illustrates a method 300 for providing missing meeting content manifests in a meeting management system. At block 302, the method includes detecting that an attendee device is disconnected from a meeting of a meeting management system. A meeting management engine 110 of the meeting management system that is configured to provide access to the meeting session associated with the meeting content. The meeting content is stored as a plurality of segments.

At block 304, the method further includes detecting that the attendee device is reconnected to the meeting. The meeting management system comprises a meeting management engine 110 for calculating a period of time during which the attendee device is disconnected and for determining segments of meeting content corresponding to the period of time so disconnected.

At block 306, the method also includes calculating a number of segments of the meeting content associated with a period of time the attendee device was disconnected from the content management system. At block 308, the method includes generating a missing meeting content manifest corresponding to the number of segments of the meeting content associated with the period of time the attendee device was disconnected, and finally, at block 310, the method includes communicating the missing meeting content manifest.

Turning to FIG. 4, a flow diagram is provided that illustrates a method 400 for providing a first missing meeting content manifest and a second missing meeting content manifest in a meeting management system. At block 402a, the method includes detecting that a first attendee device is disconnected from a meeting of a meeting management system. The meeting management system comprises a meeting management engine 110 associated with calculating a period of time during which the first attendee device is disconnected and for determining which segments of meeting content correspond to the period of time so disconnected.

At block 404a, the method includes calculating a number of segments of the meeting content associated with a period of time the first attendee device was disconnected from the meeting. At block 406a, the method further includes generating a first manifest corresponding to the number of segments of the meeting content associated with the period of time the attendee device was disconnected and at block 408a, communicate the first manifest.

In a similar manner for a second attendee device, at blocks 402b-408b, detect that the second attendee device is disconnected from the meeting, calculate a second attendee number of segments of missing meeting content associated with a period of time the second attendee device is disconnected, generate a second manifest, and communicate the second manifest. Blocks 402a-408a may be performed partially or completely in parallel to blocks 402b-408b or may be performed entirely sequentially. The period of time the first attendee device is disconnected may overlap—partially or completely—the period of time the second attendee device is disconnected, or may be completely distinct.

Turning to FIG. 5, a flow diagram is provided that illustrates a method 500 for providing missing meeting content manifests in a meeting management system. At block 502, the method includes detecting that a speaker attendee device is disconnected from a meeting of a meeting management system.

At block 504, the method further includes detecting that the speaker attendee device is reconnected to the meeting. The meeting management system comprises a meeting management engine 110 for calculating a period of time during which the attendee device is disconnected and for determining segments of meeting content corresponding to the period of time so disconnected. The speaker attendee device comprises a meeting management engine client 122 for generating a plurality of segments of meeting content and communicating said segments to the meeting management engine 110.

At block 506, the method includes receiving a plurality of segments of a speaker attendee meeting content generated by the speaker attendee device. At block 508, the method further includes calculating a number of segments of the meeting content associated with a period of time the speaker attendee device was disconnected from the meeting. At block 510, the method includes generating a missing meeting content manifest corresponding to the number of segments of the meeting content associated with the period of time the attendee device was disconnected, and finally, at block 512, the method also includes communicating the missing meeting content manifest to the attendee device to cause display of missing meeting content associated with the missing meeting content manifest.

Embodiments of the present invention have been described with reference to several inventive features (e.g., operations, systems, engines, and components) associated with a meeting management system having a meeting management engine for providing missing meeting content manifests. Inventive features described include: operations, interfaces, data structures, and arrangements of computing resources associated with providing the functionality described herein relative to meeting management engine and user interfaces providing user interaction models. Functionality of the embodiments of the present invention have further been described, by way of an implementation and anecdotal examples—to demonstrate that the operations for providing missing meeting content based on missing meeting content manifests—are an unconventional ordered combination of operations that operate with a meeting management engine as a solution to a specific problem in meeting management technology environment to improve computing operations and interfaces for user interface navigation in meeting management systems. Overall, these improvements result in less CPU computation, smaller memory requirements, and increased flexibility in meeting management systems when compared to previous conventional meeting management system operations performed for similar functionality.

Technical Improvement and Literal Support for Claims

Methods, systems, and computer storage media for providing missing meeting content manifests. In operation, the method includes detecting that an attendee device is disconnected from a meeting. A meeting management engine is associated with a meeting management system that is configured to provide a meeting session associated with meeting content. The meeting content is stored as a plurality of segments. The method further includes detecting that the attendee device has reconnected to the meeting. The method includes calculating a number of segments of the meeting content associated with a period of time the attendee device was disconnected from the meeting. The method also includes generating a missing meeting content manifest corresponding to the number of segments of the meeting content associated with the period of time the attendee device was disconnected from the meeting. The method includes communicating the missing meeting content manifest to the attendee device to cause display of missing meeting content associated with the missing meeting content manifest. Communicating the missing content in this manner summarizes and communicates the missing meeting content in an efficient way that uses smaller memory requirements, and increased flexibility in meeting management systems when compared to previous conventional meeting management system operations performed for similar functionality.

The method includes detecting that the attendee device is disconnected from or reconnected to the meeting based on identifying a plurality of disruption conditions that indicate a complete or an intermittent disconnected state or reconnected state of the attendee device. The method includes meeting management system configured to operate based on a video content management protocol that supports managing the video content of the meeting content as the plurality of segments. The plurality of segments are associated with time codes associated with generating missing meeting content manifests.

The method includes calculating the number of segments of the meeting content is based on: determining a start time associated a disconnected state of the attendee device; determining an end time associated a reconnected state of the attendee device; and based on the start time and the end time, identifying the number of segments of meeting content corresponding to the start time and the end time.

The method includes the missing meeting content manifest that is a record of data of missing meeting content associated with the attendee device, the missing meeting manifest is associated with supplemental missing meeting content, and the supplemental missing meeting content data comprises metadata of the missing meeting content or extracted information from the number of segments of the meeting content.

The method includes communicating the missing meeting content manifest to the attendee device causes display of an interface element associated with missing meeting content manifest, the interface element comprises an interface control that supports accessing and causing display of meeting content corresponding to the missing meeting content manifest, wherein the interface control is selected from the following: a link to cause download of the missing meeting content; a chat interface that is configured to provide access to text transcript associated with the missing meeting content; and a delayed playback control to access the missing meeting content.

The method includes the number of segments of the meeting content that are based on meeting content that was recorded at a speaker attendee device that is different from the attendee device, wherein recording the meeting content at the speaker attendee device is triggered when the speaker attendee device is disconnected from the meeting.

Additional Support for Detailed Description of the Invention

Example Distributed Computing System Environment

Figure 6:
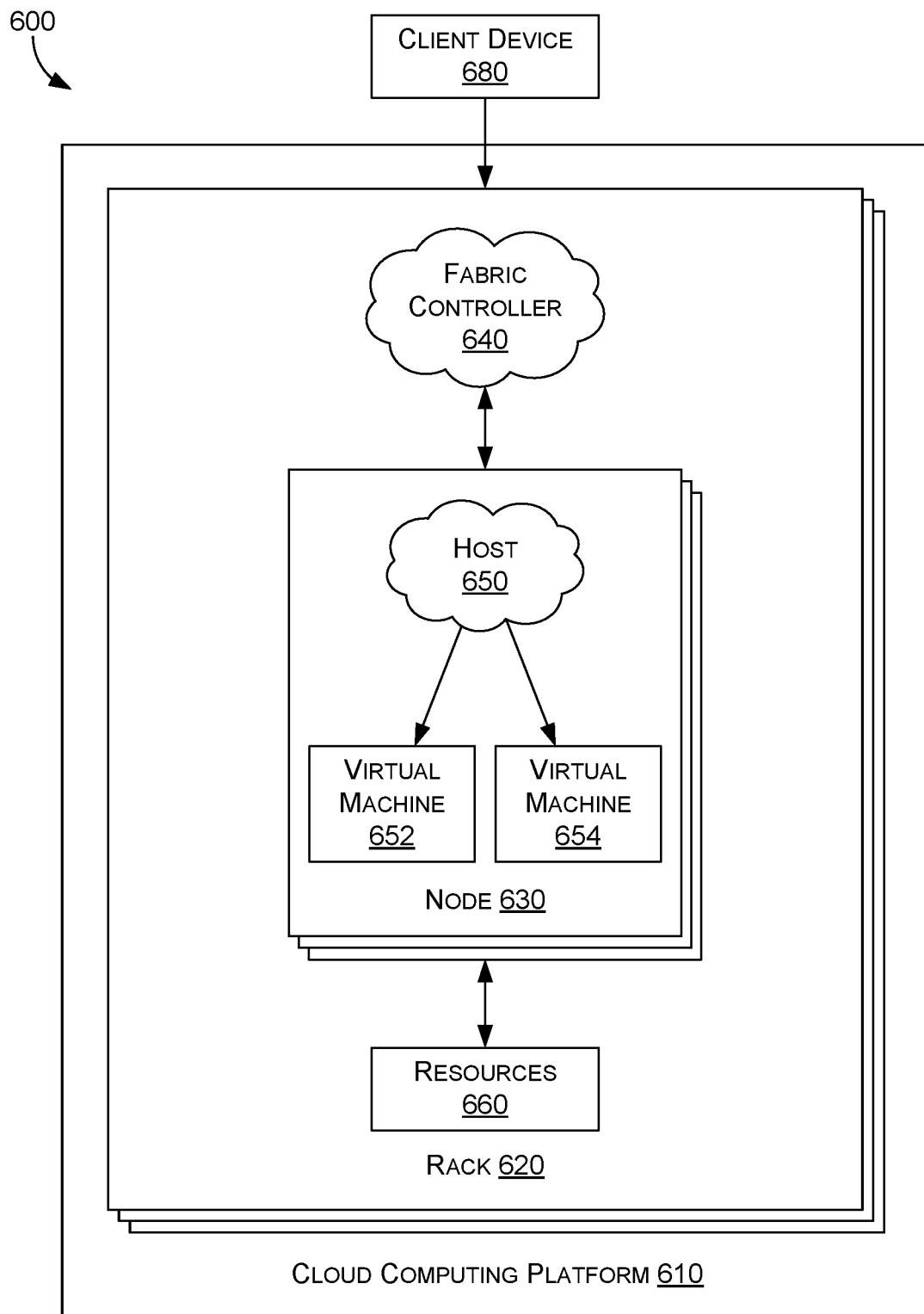
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).
Example Distributed Computing Environment Having briefly described an overview of embodiments of the present invention, an example operating environment in which embodiments of the present invention may be implemented is described below in order to provide a general context for various aspects of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
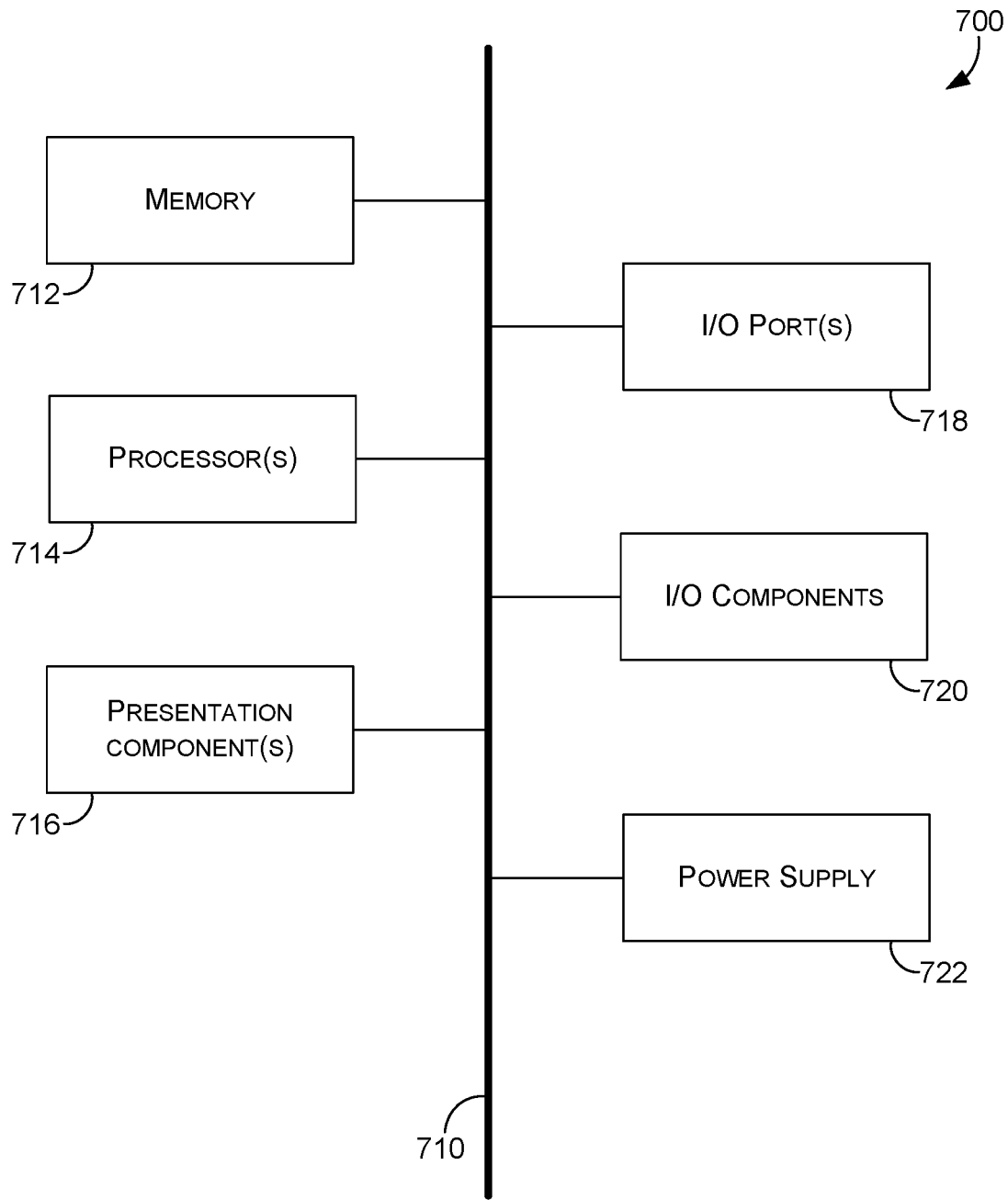
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method, the method comprising:

detecting, via a meeting management engine, that an attendee device is disconnected from a meeting, the meeting management engine is associated with a meeting management system configured to provide access to a meeting session associated with meeting content, wherein the meeting content is stored as a plurality of segments;

detecting, via the meeting management engine, that the attendee device has reconnected to the meeting;

calculating, via the meeting management engine, a number of segments of the meeting content associated with a period of time the attendee device was disconnected from the meeting;

generating, via the meeting management engine, a missing meeting content manifest corresponding to the number of segments of the meeting content associated with the period of time the attendee device was disconnected from the meeting, wherein the missing meeting content manifest is a file that identifies segments of data that correspond to the number of segments of the meeting content associated with the period of time the attendee device was disconnected from the meeting, wherein the missing meeting content manifest is associated with a video content management protocol that supports managing video content of the meeting content as the plurality segments, wherein a segment of the number of segments is created based on time unit segments of dynamic adaptive streaming segments associated with the video content management protocol; and communicating, via the meeting management engine, the file of the missing meeting content manifest to the attendee device without the number of segments of the meeting content to cause display of one or more of the number of segments of the meeting content associated with the missing meeting content manifest based on an access request associated with the file that identifies the one or more of the number of segments.

2. The method of claim 1, wherein detecting that the attendee device is disconnected from or reconnected to the meeting is based on identifying a plurality of disruption conditions that indicate a complete or an intermittent disconnected state or reconnected state of the attendee device.

3. The method of claim 1, wherein the plurality of segments are associated with time codes associated with generating the missing meeting content manifests.

4. The method of claim 1, wherein calculating the number of segments of the meeting content is based on:
   determining a start time associated a disconnected state of the attendee device;
   determining an end time associated a reconnected state of the attendee device; and
   based on the start time and the end time, identifying the number of segments of meeting content corresponding to the start time and the end time.

5. The method of claim 1, wherein the missing meeting content manifest is a record of data of missing meeting content associated with the attendee device, the missing meeting manifest is associated with supplemental missing meeting content data, and
   wherein the supplemental missing meeting content data comprises each of the following: a cause of the disconnection, an amount of time behind a live stream, metadata of the missing meeting content and extracted information from the number of segments of the meeting content.

6. The method of claim 1, wherein communicating the missing meeting content manifest to the attendee device causes display of an interface element associated with missing meeting content manifest, wherein the interface element comprises an interface control that supports accessing and causing display of meeting content corresponding to the missing meeting content manifest, wherein the interface control is selected from the following:
   a link to cause download of the missing meeting content;
   a chat interface that is configured to provide access to text transcript associated with the missing meeting content; and
   a delayed playback control to access the missing meeting content.

7. The method of claim 1, the operations further comprising:
   generating, via the meeting management engine, a second missing meeting content manifest corresponding to a number of segments of the meeting content associated with a period of time a speaker attendee device was disconnected from the meeting,
   wherein the second missing meeting content manifest is a second file that identifies segments of data that correspond to the number of segments of the meeting content associated with the period of time the speaker attendee device was disconnected from the meeting;
   communicating, via the meeting management engine, a second file of the second missing meeting content manifest to the attendee device without the number of segments of the meeting content to:
   (1) cause display of the one or more of the number of segments of the meeting content associated with the first missing meeting content manifest based on the access request associated with the first file; and
   (2) cause display of one or more of the number of segments of the meeting content associated with the second missing meeting content manifest based on an access request associated with the second file,
   wherein a first portion of a meeting interface associated with the attendee device is designated for displaying the first missing meeting content associated with the attendee device, and a second portion of the meeting interface associated with the attendee device is designated for displaying the second missing meeting content associated with the speaker attendee device.

8. One or more computer-storage media having computer-executable instructions embodied thereon that, when executed by a computing system having a processor and memory, cause the processor to:
   detect, via a meeting management engine, that a first attendee device is disconnected from a meeting, the meeting management engine is associated with a meeting management system that is configured to provide access to a meeting session associated with meeting content, wherein the meeting content is stored as a plurality of segments;
   calculate, via the meeting management engine, a first attendee number of segments of the meeting content associated with a period of time the first attendee device was disconnected from the meeting;
   detect, via the meeting management engine, that a second attendee device is disconnected from the meeting;
   calculate, via the meeting management engine, a second attendee number of segments of the meeting content associated with a period of time the second attendee device was disconnected from the meeting;
   generate, via the meeting management engine, a first manifest corresponding to the first attendee number of segments,
   wherein the first manifest is a file that identifies segments of data that correspond to the first attendee number of segments,
   wherein the first manifest is associated with a video content management protocol that supports managing video content of the meeting content as the plurality segments,
   wherein a segment of the number of segments is created based on time unit segments of dynamic adaptive streaming segments associated with the video content management protocol;
   generate, via the meeting management engine, a second manifest corresponding to the second attendee number of segments;
   communicate, via the meeting management engine, the file of the first manifest to an attendee device, without the first attendee number of segments of the meeting content to cause display of one or more the first attendee number of segments associated with the first manifest based on an access request associated with the file that identifies the one or more the first attendee number of segments; and
   communicate, via the meeting management engine, the second manifest.

9. The media of claim 8, wherein detecting that the first attendee device or the second attendee device is disconnected from or reconnected to the meeting is based on identifying a plurality of disruption conditions that indicate a complete or an intermittent disconnected state or reconnected state of the first attendee device or the second attendee device.

10. The media of claim 8, wherein the plurality of segments are associated with time codes associated with generating missing meeting content manifests.

11. The media of claim 8, wherein calculating the first attendee number of segments of the meeting content is based on:
- determining a start time associated a disconnected state of the first attendee device;
- determining an end time associated a reconnected state of the first attendee device; and
- based on the start time and the end time, identifying the first attendee number of segments of meeting content corresponding to the start time and the end time.

12. The media of claim 8, wherein a missing meeting content manifest is associated with supplemental missing meeting content data, wherein the supplemental missing meeting content data comprises metadata of the missing meeting content or extracted information from the first attendee number of segments of the meeting content.

13. The media of claim 8, wherein communicating a missing meeting content manifest causes display of an interface element associated with the missing meeting content manifest, wherein the interface element comprises an interface control that supports accessing and causing display of missing meeting content corresponding to the missing meeting content manifest, wherein the interface control is selected from the following:
- a link to cause download of the missing meeting content;
- a chat interface that is configured to provide access to text transcript associated with the missing meeting content; and
- a delayed playback control to access the missing meeting content.

14. The media of claim 8, wherein the first attendee number of segments of the meeting content is based on meeting content that was recorded at a speaker attendee device that is different from the first attendee device, wherein recording the meeting content at the speaker attendee device is triggered when the speaker attendee device is disconnected from the meeting.

15. A computerized system comprising:
- one or more computer processors; and
- computer memory storing computer-useable instructions that, when used by the one or more computer processors, cause the one or more computer processors to perform operations comprising:
  - detecting, via a meeting management engine, that a speaker attendee device is disconnected from a meeting, the meeting management engine is associated with a meeting management system that is configured to provide access to a meeting session associated with meeting content, wherein the meeting content is stored as a plurality of segments;
  - determining, via the meeting management engine, that the speaker attendee device has reconnected to the meeting;
  - receiving from the speaker attendee device, via the meeting management engine, a plurality of segments of the speaker attendee device meeting content generated by the speaker attendee device;
  - calculating, via the meeting management engine, a number of segments of the meeting content associated with a period of time the speaker attendee device was disconnected from the meeting;
  - generating, via the meeting management engine, a missing meeting content manifest corresponding to the number of segments of the meeting content associated with the period of time the speaker attendee device was disconnected from the meeting, wherein the missing context manifest is a file that identifies segments of data that correspond to the number of segments of the meeting content associated with the period of time the speaker attendee device was disconnected from the meeting, wherein the missing meeting content manifest is associated with a video content management protocol that supports managing the video content of the meeting content as the plurality of segments, wherein a segment of the number of segments is created based on time unit segments of dynamic adaptive streaming segments associated with the video content management protocol; and
  - communicating, via the meeting management engine, the file of the missing meeting content manifest to a second attendee device without the number of segments of the meeting content to cause display of one or more of the number of segments based on an access request associated with the file that identifies the one or more of the number of segments.

16. The system of claim 15, wherein detecting that the speaker attendee device is disconnected from or reconnected to the meeting is based on identifying a plurality of disruption conditions that indicate a complete or an intermittent disconnected state or reconnected state of the attendee speaker device.

17. The system of claim 15, wherein the plurality of segments are associated with time codes associated with generating missing meeting content manifests.

18. The system of claim 15, wherein calculating the number of segments of the meeting content is based on:
- determining a start time associated a disconnected state of the speaker attendee device;
- determining an end time associated a reconnected state of the speaker attendee device;
- based on the start time and the end time, identifying the number of segments of meeting content corresponding to the start time and the end time.

19. The system of claim 15, wherein the missing meeting content manifest is associated with supplemental missing meeting content data, wherein the supplemental missing meeting content data comprises metadata of the missing meeting content or extracted information from the number of segments of the meeting content.

20. The system of claim 15, wherein communicating the missing meeting content manifest to the second attendee device causes display of an interface element associated with missing meeting content manifest, wherein the interface element comprises an interface control that supports accessing and causing display of meeting content corresponding to the missing meeting content manifest, wherein the interface control is selected from the following:
- a link to cause download of the missing meeting content;
- a chat interface that is configured to provide access to text transcript associated with the missing meeting content; and
- a delayed playback control to access the missing meeting content.

* * * * *